United States Patent
Tachikawa et al.

(10) Patent No.: US 9,205,346 B2
(45) Date of Patent: Dec. 8, 2015

(54) DISTILLATION APPARATUS AND METHOD FOR CONTROLLING THE SAME

(71) Applicant: TOYO ENGINEERING CORPORATION, Tokyo (JP)

(72) Inventors: Kouichi Tachikawa, Narashino (JP); Takato Nakao, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 0 days.

(21) Appl. No.: 14/075,144

(22) Filed: Nov. 8, 2013

(65) Prior Publication Data

US 2014/0131191 A1    May 15, 2014

(30) Foreign Application Priority Data

Nov. 15, 2012   (JP) .................................. 2012-251321

(51) Int. Cl.
| | |
|---|---|
| *B01D 3/32* | (2006.01) |
| *B01D 1/28* | (2006.01) |
| *B01D 3/00* | (2006.01) |
| *B01D 3/42* | (2006.01) |

(52) U.S. Cl.
CPC .................. *B01D 1/28* (2013.01); *B01D 3/007* (2013.01); *B01D 3/42* (2013.01)

(58) Field of Classification Search
CPC ............ B01D 3/007; B01D 3/32; B01D 3/42; B01D 3/4211; B01D 3/4261; B01D 1/28
USPC ...................................... 203/25, 26, DIG. 18
See application file for complete search history.

(56) References Cited

U.S. PATENT DOCUMENTS

2012/0085126 A1    4/2012   Gupta et al.

FOREIGN PATENT DOCUMENTS

| DE | 10 2007 004 788 A1 | 8/2008 |
|---|---|---|
| EP | 1 380 328 A1 | 1/2004 |
| WO | 2012/099462 A1 | 7/2012 |
| WO | 2012/099463 A1 | 7/2012 |

OTHER PUBLICATIONS

Extended European Search Report dated Feb. 18, 2014 in corresponding EP Application No. 13190080.5.

*Primary Examiner* — Prem C Singh
*Assistant Examiner* — Brandi M Doyle
(74) *Attorney, Agent, or Firm* — Knobbe Martens Olson & Bear LLP

(57) ABSTRACT

In a heat integrated distillation column (HIDiC), the product purity can be stably maintained against various disturbances. Provided is a method for controlling a distillation apparatus, which includes a high-pressure part including the whole or a part of a rectifying section and performing gas-liquid contact at a relatively high pressure; a low-pressure part including the whole or a part of a stripping section and performing gas-liquid contact at a relatively low pressure; a line for directing overhead vapor of the low-pressure part to a column bottom of the high-pressure part; a line for directing a column bottom liquid of the high-pressure part to a column top of the low-pressure part; and a heat exchange structure for transferring heat from the rectifying section to the stripping section, wherein the method includes controlling a flow rate of the column bottom liquid to be directed from the high-pressure part to the low-pressure part. Also provided is the distillation apparatus including a flow rate control means in the line for directing the bottom liquid of the high-pressure part to the low-pressure part.

1 Claim, 12 Drawing Sheets

H.P.: High Pressure
L.P.: Low Pressure

H.P.: High Pressure
L.P.: Low Pressure

C9A Composition in Distillate Liquid in Process I (Invention)
— C9A Composition in Distillate Liquid in Process II (Comparison)

(a)

C8A Composition in Bottom Product in Process I (Invention)
— C8A Composition in Bottom Product in Process II (Comparison)

(b)

DISTILLATION APPARATUS AND METHOD FOR CONTROLLING THE SAME

This application is based upon and claims the benefit of priority from Japanese patent application No. 2012-251321, filed on Nov. 15, 2012, the disclosure of which is incorporated herein in its entirety by reference.

BACKGROUND OF THE INVENTION

1. Field of the Invention

The present invention relates to a distillation apparatus used for carrying out a distillation operation widely employed in a large number of industrial processes, and more particularly, it relates to a distillation apparatus in which heat exchange is effected between a rectifying section and a stripping section.

2. Description of the Related Art

Distillation separation is widely employed in industrial processes in general but is a unit operation that consumes extremely large energy. Therefore, a distillation apparatus in which energy consumption can be reduced has been studied in the industry. In these studies, a heat integrated distillation column (hereinafter sometimes referred to as HIDiC) has been developed as a distillation apparatus excellent in energy saving.

Traditionally, a section located above a feedstock feed stage of a distillation column used for carrying out continuous distillation is referred to as a rectifying section, and a section below the feedstock feed stage is referred to as a stripping section. The distillation column is provided with a condenser for cooling and condensing overhead vapor and a reboiler for heating and boiling a column bottom liquid by heating.

A HIDiC has a basic configuration in which a rectifying section and a stripping section of one distillation column have been separated from each other. The operation pressure of the rectifying section is set to be higher than the operation pressure of the stripping section, so that the operation temperature of the rectifying section becomes higher than the operation temperature of the stripping section. And, the HIDiC is configured so that heat exchange can be effected between the rectifying section and the stripping section. Accordingly, heat is transferred from the rectifying section to the stripping section, and therefore, it is possible to reduce the amount of heat supplied at the reboiler and to reduce the amount of heat removed at the condenser. In other words, by transferring the heat from the rectifying section to the stripping section by the heat exchange, the heat supplied at the reboiler and the heat removed at the condenser can be at least partially substituted, and as a result, a distillation apparatus having extremely high energy efficiency can be obtained.

In order to put such a HIDiC into a practical use, JP H08-66601A has proposed a distillation apparatus, which employs a shell and tube type heat exchange structure as a basic configuration, uses the inside and the outside of a tube respectively as a rectifying section and a stripping section, and can transfer heat from the rectifying section to the stripping section by using a tube wall as a heat transfer surface. Furthermore, as an improvement proposal for this distillation apparatus, JP2004-16928A has proposed a distillation apparatus, which employs a double tube as the tube and uses an innermost portion and a circumferential portion of the double tube respectively as the rectifying section and the stripping section.

Furthermore, International Publication No. WO2011/043199 has proposed a distillation apparatus, in which a rectifying column (a rectifying section) and a stripping column (a stripping section) are connected to each other by way of piping, and heat exchange is effected between the rectifying column and the stripping column by providing a heat exchanger in the rectifying column and introducing a liquid withdrawn from the stripping column into this heat exchanger or by providing a heat exchanger in the stripping column and introducing vapor withdrawn from the rectifying column into this heat exchanger.

SUMMARY OF THE INVENTION

It is necessary for a distillation apparatus to stably maintain product purity against various disturbances occurring during its operation. A HIDiC is, however, still under development, and a method for controlling it has not been established yet.

An object of the present invention is to provide a HIDiC and a method for controlling the same in which product purity can be stably maintained against various disturbances.

An aspect of the present invention provides a method for controlling a distillation apparatus which includes
a high-pressure part including the whole or a part of a rectifying section and configured to perform gas-liquid contact at a relatively high pressure; a low-pressure part including the whole or a part of a stripping section and configured to perform gas-liquid contact at a relatively low pressure; a line for directing an overhead vapor of the low-pressure part to a column bottom of the high-pressure part;
a line for directing a column bottom liquid of the high-pressure part to a column top of the low-pressure part; and
a heat exchange structure configured to transfer heat from the rectifying section to the stripping section,
wherein the method includes controlling a flow rate of the column bottom liquid directed from the high-pressure part to the low-pressure part.

Another aspect of the present invention provides a distillation apparatus including:
a high-pressure part including the whole or a part of a rectifying section and configured to perform gas-liquid contact at a relatively high pressure;
a low-pressure part including the whole or a part of a stripping section and configured to perform gas-liquid contact at a relatively low pressure;
a line for directing an overhead vapor of the low-pressure part to a column bottom of the high-pressure part;
a line for directing a column bottom liquid of the high-pressure part to a column top of the low-pressure part; and
a heat exchange structure configured to transfer heat from the rectifying section to the stripping section,
wherein the line for directing the column bottom liquid of the high-pressure part to the low-pressure part includes a flow rate control means.

The present invention provides a HIDiC and a method for controlling the same in which product purity can be stably maintained against various disturbances.

DETAILED DESCRIPTION OF THE EXEMPLARY EMBODIMENT

Figure 1:
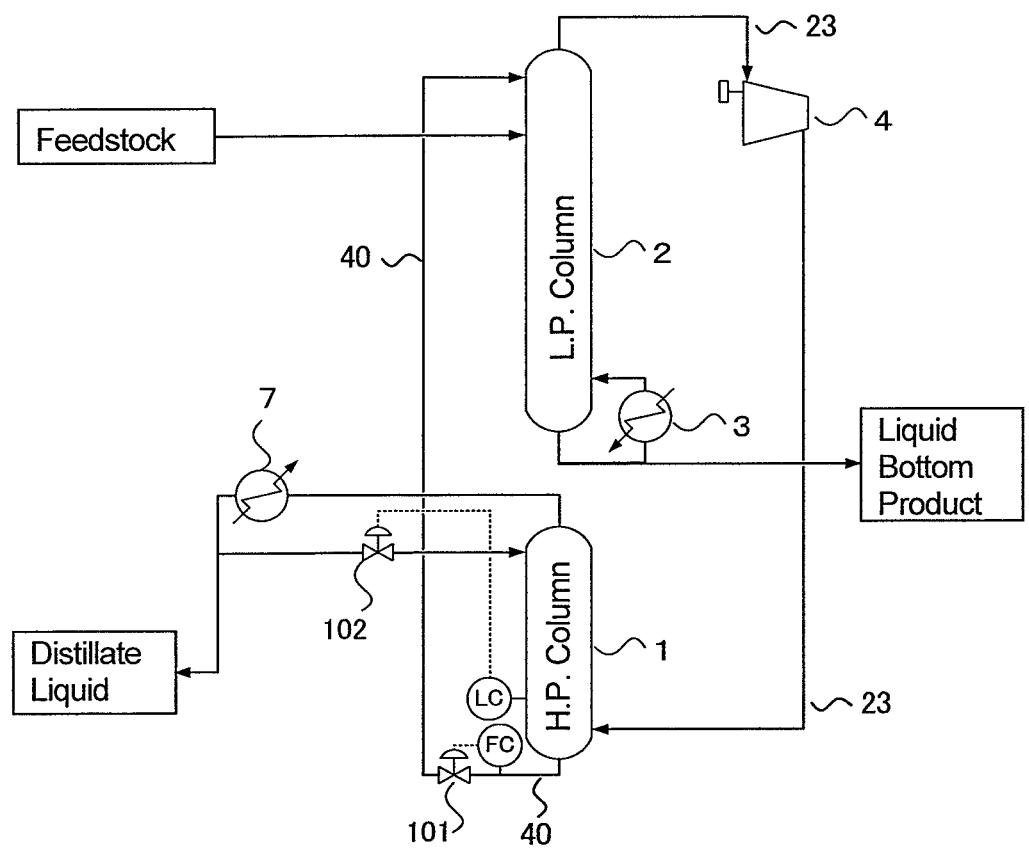
FIG. 1 schematically shows an example of a configuration of a HIDiC to which the present invention is applicable.

The present invention will now be described with reference to the drawings, but is not limited thereto. In the following description, "C8" means that a carbon number is 8, "C9" means that a carbon number is 9, and "C8A" means a C8 aromatic compound(s), namely, an aromatic compound(s) having 8 carbon atoms, and "C9A" means a C9 aromatic compound(s), namely, an aromatic compound(s) having 9 carbon atoms.

[Basic Structure of HIDiC]

Components included in a HIDiC will be mentioned below.

A high-pressure part that includes the whole or a part of a rectifying section and performs gas-liquid contact at a relatively high pressure A low-pressure part that includes the whole or a part of a stripping section and performs gas-liquid contact at a relatively low pressure The terms of the "rectifying section" and the "stripping section" regarding a distillation operation have been used for a long period of time with respect to a distillation apparatus, particularly a continuous distillation apparatus. The rectifying section corresponds to a section located above a feedstock feeding position in a conventional distillation column configured with a single column. The stripping section corresponds to a section located below the feedstock feeding position in the conventional distillation column. In other words, the rectifying section is a section of a distillation apparatus (typically, a distillation column) through which a fraction lighter than the feedstock flows. The stripping section is a section of a distillation apparatus (typically, a distillation column) through which a fraction heavier than the feedstock flows.

The operation pressure of the high-pressure part is set to be higher than the operation pressure of the low-pressure part so that the temperature of the rectifying section is higher than the temperature of the stripping section and thus heat can be transferred from the rectifying section to the stripping section by indirect heat exchange. Here, a "relatively high or low pressure" is based on comparison between the pressures of the low-pressure part and the high-pressure part with each other.

The high-pressure part basically corresponds to the rectifying section and the low-pressure part basically corresponds to the stripping section. Accordingly, in the most basic configuration of the HIDiC, the high-pressure part includes the rectifying section but does not include the stripping section, and the low-pressure part includes the stripping section but does not include the rectifying section. In other words, the high-pressure part includes the whole of the rectifying section and the low-pressure part includes the whole of the stripping section. However, a configuration of a HIDiC is not limited to such a configuration. The low-pressure part may include the whole of the stripping section and also a part of the rectifying section, while the rest of the rectifying section may be included in the high-pressure part. Alternatively, the high-pressure part may include the whole of the rectifying section and also a part of the stripping section, while the rest of the stripping section may be included in the low-pressure part.

In other words, the basic structure of the HIDiC is a structure that is obtained by partitioning a conventional distillation column, using a feedstock feed position as a boundary, into two regions (a high-pressure part including the whole of the rectifying section, and a low-pressure part including the whole of the stripping section). The structure of the HIDiC is not, however, limited to this structure. It is also possible to employ a structure that is obtained by partitioning a conventional distillation column into two regions at a position above the feedstock feed position, namely, a structure in which a single column is partitioned (a position located partway along the rectifying section is used as a boundary) into two regions (a low-pressure part including the whole of the stripping section and a part of the rectifying section, and a high-pressure part not including the stripping section but including the rest of the rectifying section). Alternatively, it is possible to employ a structure in which a conventional distillation column is partitioned (a position located partway along the stripping section is used as a boundary) into two regions (a high-pressure part including the whole of the rectifying section and a part of the stripping section, and a low-pressure part not including the rectifying section but including the rest of the stripping section).

Naturally, if one of the high-pressure part and the low-pressure part includes both the rectifying section and the stripping section, the other never includes both of the rectifying section and the stripping section.

Each of the high-pressure part and the low-pressure part is typically formed by using a single column (vessel). A high-pressure column forming the high-pressure part and a low-pressure column forming the low-pressure part may be provided so as to be spaced from each other. Alternatively, the high-pressure column and the low-pressure column may be integrated with each other to form a single structure. For example, it is possible to divide the inside of a single vessel by a partition wall (a member through which fluid cannot pass) for forming two regions, and to use one of the regions as the high-pressure column and the other as the low-pressure column.

A line for directing an overhead vapor of the low-pressure part to the column bottom of the high-pressure part In a conventional distillation column, vapor ascends from a lower section (the stripping section) of the column to an upper section (the rectifying section). In the HIDiC, since the stripping section and the rectifying section are basically separated (partitioned), this line is provided for enabling such a stream of the vapor.

This line is provided with pressurizing means, such as a compressor, for transferring a vapor from the low-pressure part (having a relatively low pressure) to the high-pressure part (having a relatively high pressure).

A line for directing a column bottom liquid of the high-pressure part to the column top of the low-pressure part.

In a conventional distillation column, liquid descends from an upper section (the rectifying section) of the column to a lower section (the stripping section). In the HIDiC, since the stripping section and the rectifying section are basically separated (partitioned), this line is provided for enabling such a stream of the liquid. This stream is sometimes referred to as an "intermediate reflux", and this line is sometimes referred to as an "intermediate reflux line".

A heat exchange structure for transferring heat from the rectifying section to the stripping section As described in JP H08-66601A or JP 2004-16928A, if the inside and the outside of a tube are used as the rectifying section (the high-pressure part) and the stripping section (the low-pressure part), the tube wall functions as a heat transfer surface. That is, a shell and tube type heat exchange structure can be employed.

In the distillation apparatus as described in WO 2011/043199, a heat exchange structure can include one of or both of the following a and b:

a) a heat exchanger provided in the rectifying section (typically, the rectifying section included in the high-pressure part), and a line for withdrawing a liquid from the stripping section (typically, the stripping section included in the low-pressure part) and passing the liquid through this heat exchanger, and returning the resulting fluid to this stripping section; and b) a heat exchanger provided in the stripping section (typically, the stripping section included in the low-pressure part), and a line for withdrawing a vapor from the rectifying section (typically, the rectifying section included in the high-pressure part), passing the vapor through this heat exchanger, and returning the resulting fluid to this rectifying section.

Alternatively, it is possible to employ a structure in which a heat exchanger is provided outside the high-pressure part and outside the low-pressure part (typically, outside the high-pressure column and outside the low-pressure column), a liquid is withdrawn from the stripping section (typically the stripping section included in the low-pressure part) and returned via this heat exchanger to this stripping section, and vapor is withdrawn from the rectifying section (typically, the rectifying section included in the high-pressure part) and returned via this heat exchanger to this rectifying section, thereby effecting heat exchange between these fluids.

The heat exchange structure may be any structure as long as heat can be transferred ultimately from the rectifying section to the stripping section, and the heat exchange structure can be realized without directly using any of a fluid present in the rectifying section and a fluid present in the stripping section. For example, a fluid discharged from the rectifying section and having a relatively high pressure (high temperature) can be used in place of a fluid present in the rectifying section. Besides, a fluid which is to be fed into the stripping section and has a relatively low pressure (low temperature) can be used in place of a fluid present in the stripping section. For example, by exchanging heat between a feedstock which is to be fed into the stripping section (typically, the stripping section included in the low-pressure part) and the overhead vapor withdrawn from the column top of the rectifying section (typically, the rectifying section included in the high-pressure part), heat can be transferred from the rectifying section to the stripping section.

A single heat exchange structure may be employed, or a plurality of heat exchange structures may be employed.

Here, discussion will be made on a configuration in which a low-pressure part includes the whole of the stripping section and a part of the rectifying section and a high-pressure part includes a part of the rectifying section. This configuration includes, for example, an embodiment in which a low-pressure column includes, above the stripping section, a part of the rectifying section and a high-pressure column includes the rest of the rectifying section. In such an embodiment, an overhead fluid of the low-pressure column (that is, a fluid discharged from the part of the rectifying section included in the low-pressure column) can be transferred to the column bottom of the high-pressure column via a compressor, and in this case, heat of the compressor outlet fluid can be given to a fluid present in the stripping section of the low-pressure column by heat exchange. For example, a heat exchange structure may be provided within the stripping section of the low-pressure column (for example, at a stage directly above the column bottom of the low-pressure column), and the overhead fluid of the low-pressure column may be supplied to the column bottom of the high-pressure column via the compressor and this heat exchange structure. By such heat exchange, heat can be transferred from the rectifying section included in the low-pressure column to the stripping section included in the low-pressure column. An example of such a structure is proposed in Japanese Patent Application No. 2012-080525.

The whole contents of Japanese Patent Application No. 2012-080525 and International Application PCT/JP2010/066498 (WO2011/043199) filed by the same applicant as the present Application are incorporated herein by reference.

[Control of HIDiC]

In a conventional distillation column composed of a single vessel (column), a flow rate of an overhead external reflux is generally controlled for stably maintaining product purity. In other words, an overhead vapor withdrawn from the column top is cooled and condensed by a condenser so as to reflux the resulting condensed liquid to the distillation column, and a flow rate of the reflux is controlled.

Similarly, a flow rate of an overhead external reflux may be controlled also in a HIDiC. According to the inventors' study, however, a flow rate of an intermediate reflux may fluctuate depending upon the amount of heat exchange between the rectifying section and the stripping section in the HIDiC. Therefore, it is considered that, even when the flow rate of the overhead external reflux is controlled, if the amount of the heat exchange fluctuates by any disturbance, the flow rate of the intermediate reflux may largely fluctuate, and this fluctuation may disturb the temperature and compositions of fluids within the distillation column, and as a result, the purity of a resulting product may be impaired. The inventors have found that the inside of the distillation column can be made more stable against disturbances by controlling not the flow rate of the overhead external reflux but the flow rate of the intermediate reflux, and as a result, it is easy to maintain the product purity. The present invention has been accomplished based on such finding.

FIG. 1 schematically shows an example of a configuration of a HIDiC applicable to a case where the flow rate of the intermediate reflux is controlled. The HIDiC shown in FIG. 1 includes a high-pressure part (that is herein a high-pressure column 1 which is a column operated at a relatively high pressure) and a low-pressure part (that is herein a low-pressure column 2 which is a column operated at a relatively low pressure). The low-pressure column includes the whole of a stripping section and a part of a rectifying section. In the low-pressure column 2, a section located below a feedstock feed location corresponds to the stripping section, and a section located above the feedstock feed location corresponds to the part of the rectifying section. The high-pressure column 1 includes the rest part of the rectifying section.

A feedstock is supplied to the low-pressure column 2. A line 23 for directing overhead vapor of the low-pressure column 2 to a column bottom of the high-pressure column 1 is provided, and a compressor 4 is provided in the line 23. A line (intermediate reflux line) 40 for directing a column bottom liquid of the high-pressure column to the low-pressure column (particularly, a column top of the low-pressure column) is provided. This intermediate reflux line is provided with a flow control valve 101, whereby a flow rate of an intermediate reflux is controlled at a predetermined value (a target value of the control).

The flow rate of the intermediate reflux may be controlled by a valve (flow control valve), or may be controlled by another flow rate control means such as control of the number of revolutions of a pump. The target value of the control of the intermediate reflux is adjusted so that an impurity concentration in a product (such as a bottom product or a distillate product described later) is to be a predetermined value or less. Although not shown in FIG. 1, the intermediate reflux line can be provided with a pressure-feeding means such as a pump.

A part of a column bottom liquid of the low-pressure column 2 is heated by a reboiler 3, and then returned to the low-pressure column, and the rest of the column bottom liquid is taken out as a liquid bottom product (bottom product). An overhead vapor of the high-pressure column is cooled and condensed by a condenser 7, and a part of the thus condensed liquid is returned to the high-pressure column (as an overhead external reflux) and the rest is taken out as a distillate liquid (distillate product). A liquid level control valve 102 is provided for adjusting the amount of a liquid (the height of a liquid level) held in the column bottom of the high-pressure column. A heat exchange structure for performing heat transfer from the rectifying section to the stripping section is not shown in FIG. 1.

Figure 2:
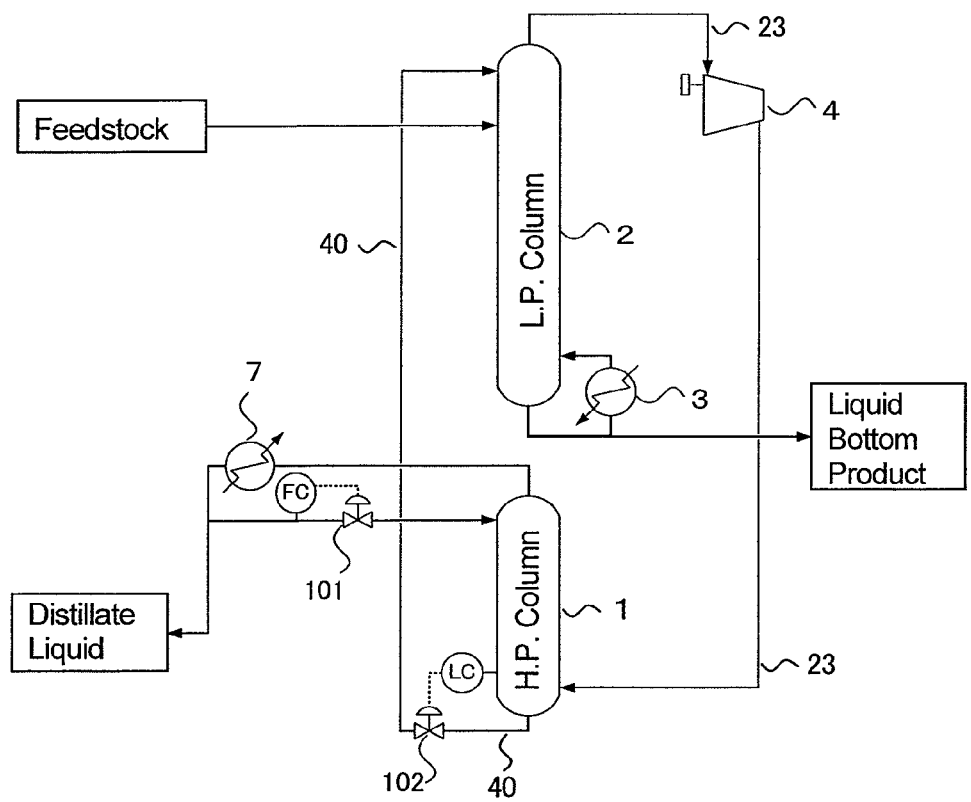
FIG. 2 schematically shows an example of a configuration of a HIDiC for comparison.

For comparison, FIG. 2 shows an example of a HIDiC employed in a case where the flow rate of the overhead external reflux is controlled. In the HIDiC shown in FIG. 2 for comparison, a flow control valve 101 is provided in an overhead external reflux line, so as to control the flow rate of the overhead external reflux at a predetermined value (target value). A liquid level control valve 102 provided in the intermediate reflux line 40 is used for adjusting the amount of a liquid held in a high-pressure column. Apart from these, the configuration is the same as that of the configuration example shown in FIG. 1.

For a case where the HIDiC having the configuration shown in FIG. 1 is used as a xylene column, examples of loads of vapor and liquid in the column (that is, flow rates of vapor and liquid in the column) were obtained by simulation.

The HIDiC used for this study will now be described in more detail with reference to FIG. 3. The HIDiC is normally operated with a column top pressure of the high-pressure column 1 of approximately 400 kPaA and a column top pressure of the low-pressure column 2 of approximately 250 kPaA. A feedstock consisting of mixed xylene (p-, m- and o-xylene) and a C9 aromatic compound is supplied to the HIDiC as a raw material. By way of the distillation performed by the HIDiC, mixed xylene is obtained as a distillate liquid from the column top (the column top of the high-pressure column) and a C9 aromatic compound is obtained as a liquid bottom product from the column bottom (the column bottom of the low-pressure column). The distillate liquid is contaminated by the C9 aromatic compound and the liquid bottom product is contaminated by the mixed xylene. In order to maintain the product purity, it is necessary to suppress the concentrations of these impurities mixed in the products to required specification values or lower. The required specification values of this xylene column are 0.7 mol % of the concentration of the C9 aromatic compound in the distillate liquid and 1.8 mol % of the concentration of the mixed xylene in the liquid bottom product.

Figure 3:
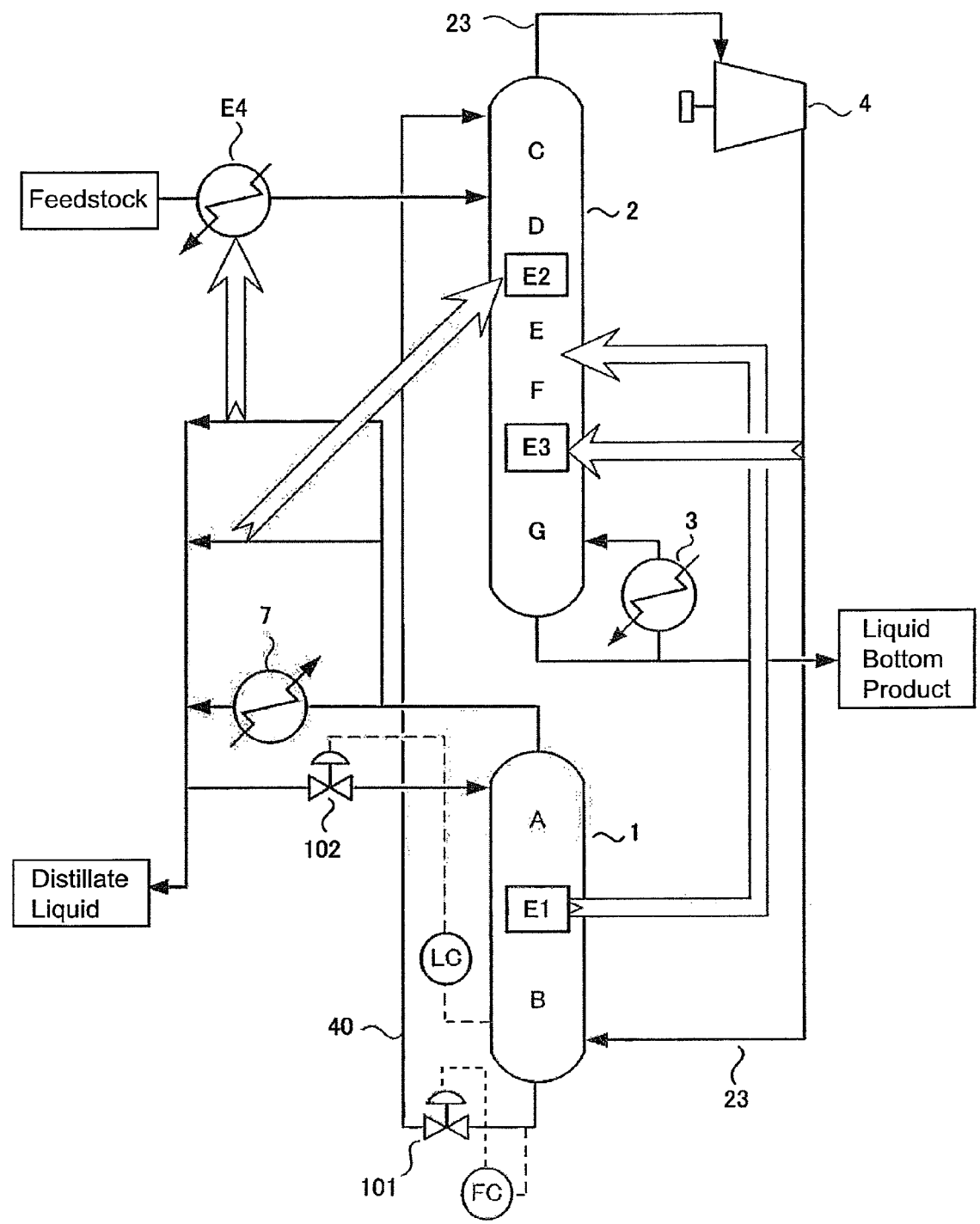
FIG. 3 shows an example of a configuration of a HIDiC to which the present invention is applicable.

As shown in FIG. 3, the HIDiC includes regions A to G therein. The regions A to C correspond to the rectifying section, and the regions D to G correspond to the stripping section. The regions A and B correspond to a part of the rectifying section included in the high-pressure column. The region C corresponds to a part of the rectifying section included in the low-pressure column and is located above the stripping section (regions D to G). Each of the regions A to G includes a trayed section or a packed bed section therein, and gas-liquid contact is performed in each of these regions.

The inside of the high-pressure column 1 is divided into the regions A and B, and a heat exchanger E1 is provided between these regions. A fluid (liquid) withdrawn from between the regions E and F of the low-pressure column 2 is heated by the heat exchanger E1 and changed into a gas-liquid two-phase stream, and then is returned to between the regions E and F. FIG. 3 does not precisely show the withdrawal and return of fluids for heat exchange for the sake of simplification, instead, heat transfer caused by the heat exchange is shown by using white arrows (not only with respect to the heat exchanger E1 but also with respect to heat exchangers E2 to E4 described below).

The inside of the low-pressure column 2 is divided into the regions C to G. A feedstock is supplied to between the regions C and D. The heat exchanger E2 is provided between the regions D and E. A part of the overhead vapor (the overhead vapor of the high-pressure column) is branched upstream from a condenser 7 to be introduced to the heat exchanger E2, and the vapor is cooled and liquefied in the heat exchanger E2 by a fluid present in the stripping section, and the resulting stream joins the outlet stream of the condenser 7. In other words, the heat exchanger E2 is provided in parallel (not in series) to the condenser 7 and partly substitutes the function of the condenser 7. A liquid is withdrawn from between the regions E and F, and a gas-liquid two-phase stream is returned to between the regions E and F as described above. The heat exchanger E3 is provided between the regions F and G, and in this heat exchanger E3, the fluid present in the stripping section of the low-pressure column 2 is heated by an outlet gas of a compressor 4. Furthermore, the heat exchanger E4 is provided in a feedstock feeding line. Another part of the overhead vapor (the overhead vapor of the high-pressure part) is branched upstream from the condenser 7 to be introduced into the heat exchanger E4, and the vapor is cooled and liquefied in the heat exchanger E4 by the feedstock, and the resulting stream joins the outlet stream of the condenser 7. In other words, the heat exchanger E4 is also provided in parallel to the condenser 7 and partly substitutes the function of the condenser 7.

Figure 4:
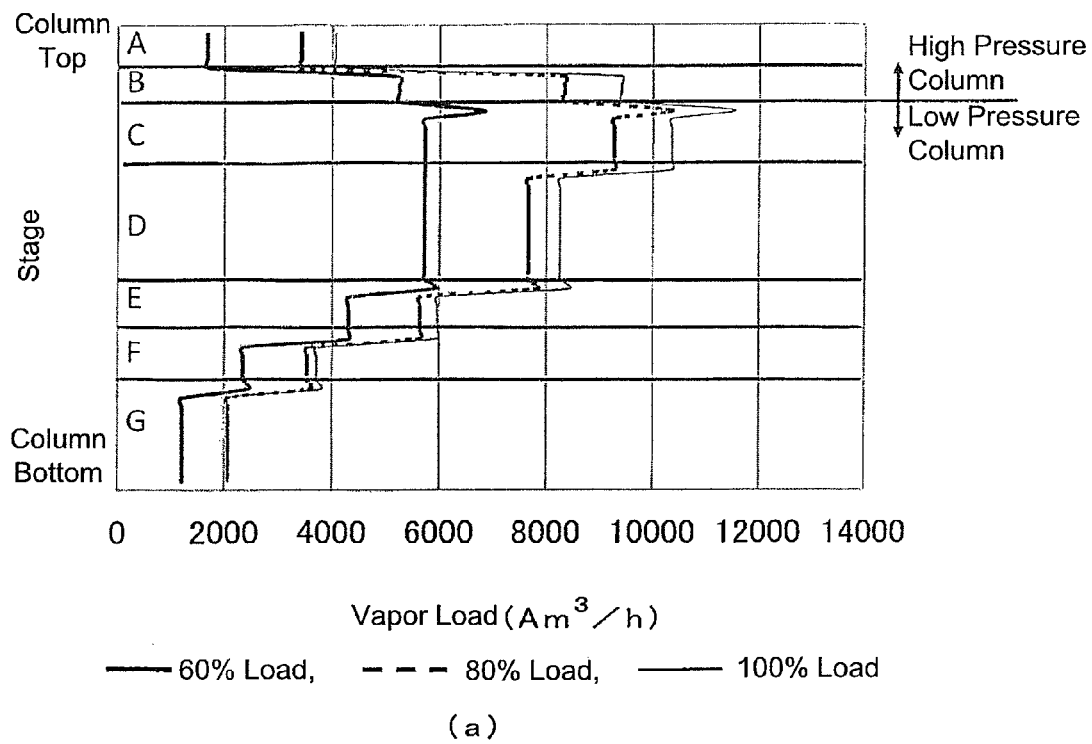
FIG. 4 shows examples of loads of vapor and liquid in a column.
Figure 4:
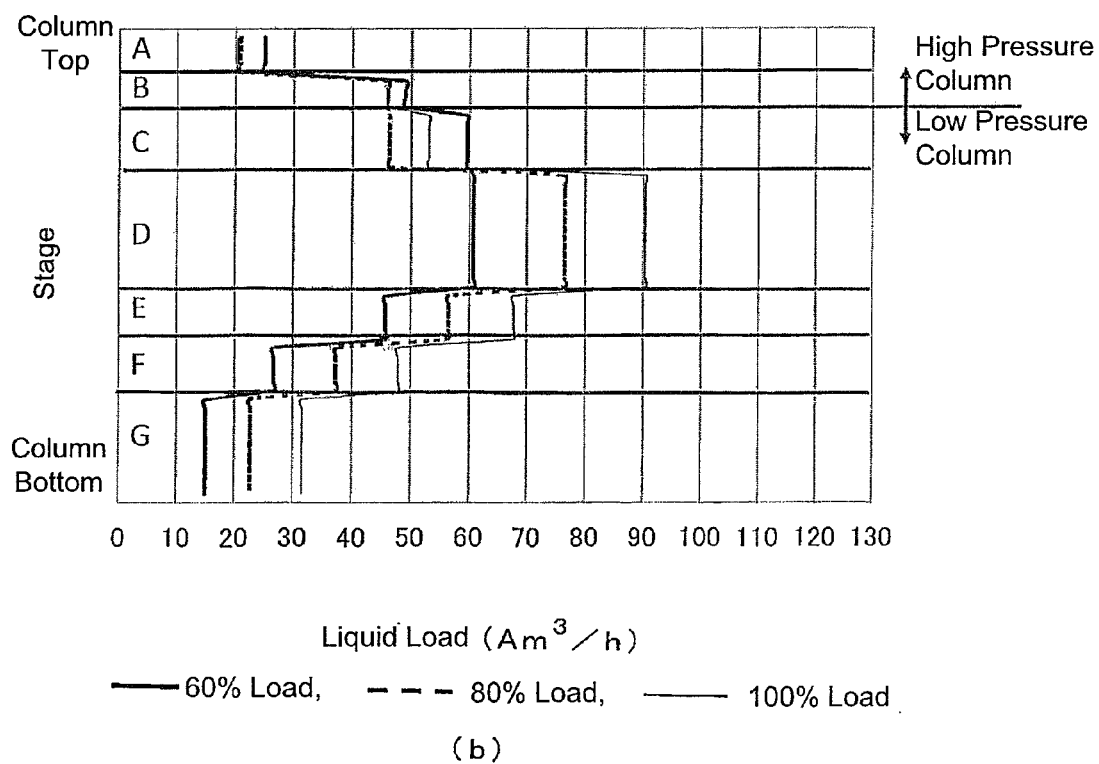

Examples of loads of vapor and liquid in the column (flow rates of vapor and liquid in the column) obtained by the simulation are shown in FIG. 4. FIG. 4(*a*) shows the vapor load and FIG. 4(*b*) shows the liquid load. A thick solid line corresponds to a case of 60% load (in a state of a total reflux operation with internal heat exchange, namely, a state where the HIDiC is operated with no feedstock feeding and no withdrawal of products), a broken line corresponds to a case of 80% load (after starting feedstock feeding and withdrawal of products), and a thin solid line corresponds to a case of 100% load (after starting feedstock feeding and withdrawal of products). The ordinate indicates a position (stage) within the column (the high-pressure column and the low-pressure column), and the abscissa indicates the load (flow rate) in a corresponding position. In the unit of the abscissa, "A" is intended to mean an actual flow rate.

It is understood, from FIG. 4, that the load is higher at intermediate stages than in the column top (the column top of the high-pressure column) and the column bottom (the column bottom of the low-pressure column). FIG. 4(b) shows that the flow rate of the intermediate reflux (that is, the liquid load in the region C) is approximately 5 times as high as the flow rate of the overhead external reflux (that is, the liquid load in the region A). Such characteristics are similarly observed in a shell and tube type HIDiC.

Accordingly, since the flow rate of the intermediate reflux is higher than that of the overhead external reflux, the intermediate reflux more largely affects the inside of the column. Therefore, even when the flow rate of the overhead external reflux can be controlled at a constant value, if the intermediate reflux fluctuates, the state within the column is disturbed, resulting in a possibility that the product purity is impaired. On the other hand, if the flow rate of the intermediate reflux is controlled at a constant value, it is possible to make the state within the column more stable, and, as a result, possible to stabilize the product purity.

[Robustness Against Disturbances]

With respect to each of processes I and II described below, robustness of a HIDiC against disturbances was evaluated by using a dynamic simulator.

Process I: The HIDiC according to the present invention shown in FIG. 3 was used. The flow rate of the intermediate reflux was fixed to a predetermined value. For process I, a study was made on a distillation apparatus which is the same (the feedstock was also the same) as the distillation apparatus used in the study on control of the HIDiC described above with reference to FIGS. 3 and 4. Accordingly, this apparatus includes the regions A to G, the heat exchangers (E1 to E4) and the lines for withdrawing/returning fluids through these heat exchangers.

Process II: A HIDiC for comparison was used. A flow rate of an overhead external reflux, namely, the flow rate of the reflux returning from the condenser 7 (and the heat exchangers E2 and E4) to the high-pressure column was fixed to a predetermined value. The HIDiC studied here was the same as that of process I except that the locations of the flow control valve 101 and the liquid level control valve 102 were changed as shown in FIG. 2.

For each control, PID control was used, and the same values were used as PID parameters for the control in processes I and II.

In each process, the following two kinds of disturbances were applied to the HIDiC. It should be noted that, for each kind of the disturbance, both positive disturbance and negative disturbance were applied. For example, a case of applying a positive disturbance of the first kind of the disturbance is referred to as case 1a, and a case of applying a negative disturbance of the first kind of the disturbance is referred to as case 1b.

1a: The composition of the feedstock was changed (specifically, the concentration of the C9 aromatic compound was changed by +30%);

1b: the composition of the feedstock was changed (specifically, the concentration of the C9 aromatic compound was changed by −30%);

2a: the set value for the flow rate of the overhead vapor of the high-pressure column to be directed to the heat exchanger E2 was changed (by approximately +10%); and 2b: the set value for the flow rate of the overhead vapor of the high-pressure column to be directed to the heat exchanger E2 was changed (by approximately −10%).

In each case, the disturbance was applied in each of process I (according to the present invention) and process II (for comparison) at time 0, and time-dependent changes were studied for compositions of the top product and the bottom product, namely, of the distillate liquid obtained from the column top (the column top of the high-pressure column) and the liquid bottom product obtained from the column bottom (the column bottom of the low-pressure column).

Figure 5:
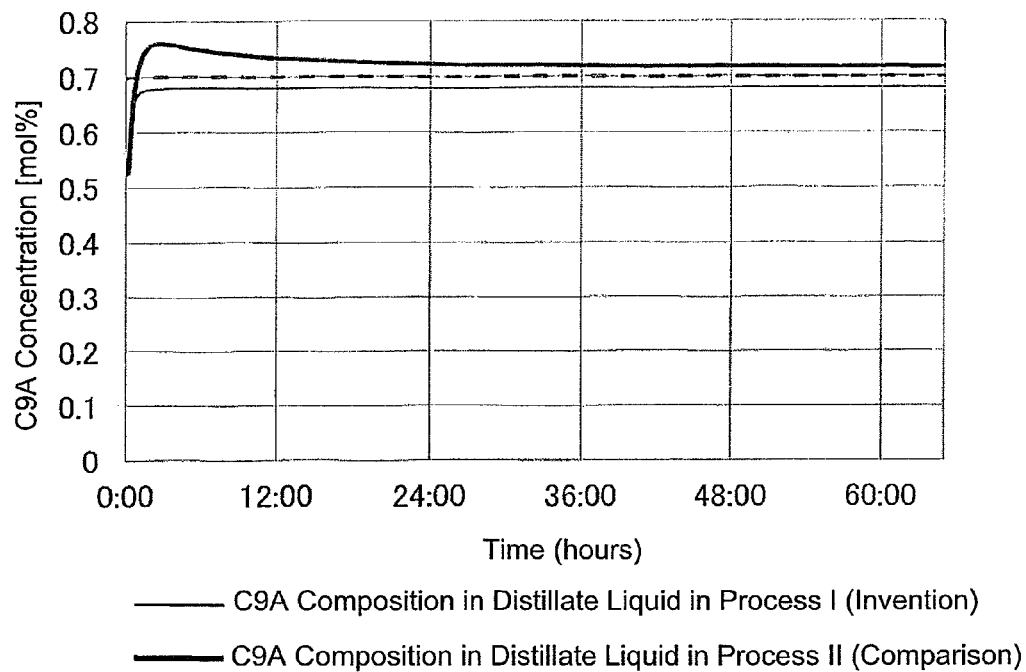
FIG. 5 shows time-dependent changes of impurity concentrations in a distillate liquid and a liquid bottom product (in case 1a)
Figure 5:
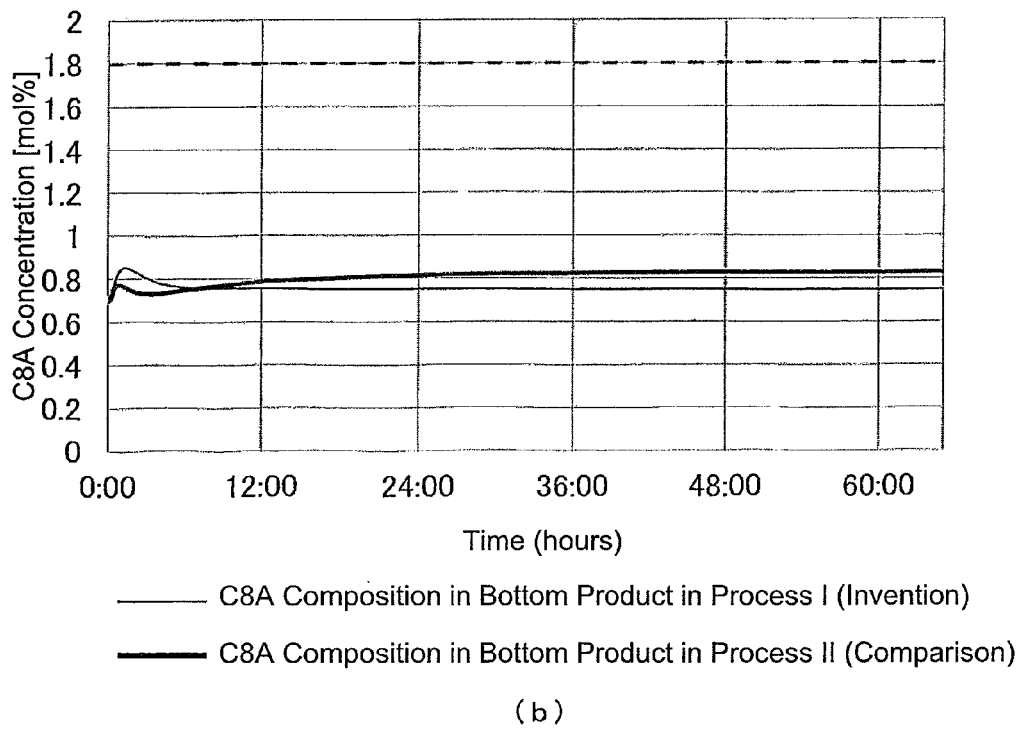

FIG. 5 shows the results of the study on case 1a (in which the composition of the feedstock was changed by +30%). In the graph of FIG. 5, a required specification value is shown with a broken line.

FIG. 5a shows time-dependent changes of the concentration (mol %) of the C9 aromatic compound in the distillate liquid. In process I according to the present invention, the concentration (mol %) of the C9 aromatic compound in the distillate liquid increased from an initial value (0.53 mol %) to become stable in 1 to 2 hours at approximately 0.68 mol %. On the other hand, in process II for comparison, the concentration of the C9 aromatic compound in the distillate liquid increased from the same initial value once up to the maximum value of approximately 0.76 mol %, then decreased and became stable at approximately 0.72 mol %. The requirement specification value is 0.70 mol %. Accordingly, the fluctuation in the product purity was obviously smaller in process I, and process I was found to be more robust against the disturbance.

FIG. 5b shows time-dependent changes of the concentration (mol %) of the C8 aromatic compounds in the liquid bottom product. In process I, the concentration of the C8 aromatic compounds in the liquid bottom product increased once from an initial value (0.70 mol %), reached the maximum value of approximately 0.85 mol % in about 1 hour, and then decreased and became stable at approximately 0.75 mol %. On the other hand, in process II, the concentration of the C8 aromatic compounds in the liquid bottom product increased once from the same initial value up to approximately 0.77 mol %, then decreased, and then increased again to reach approximately 0.82 mol % after approximately 65 hours. The required specification value is 1.80 mol %. Accordingly, with respect to the product purity of the liquid bottom product, there was no significant difference between process I and process II.

Figure 6:
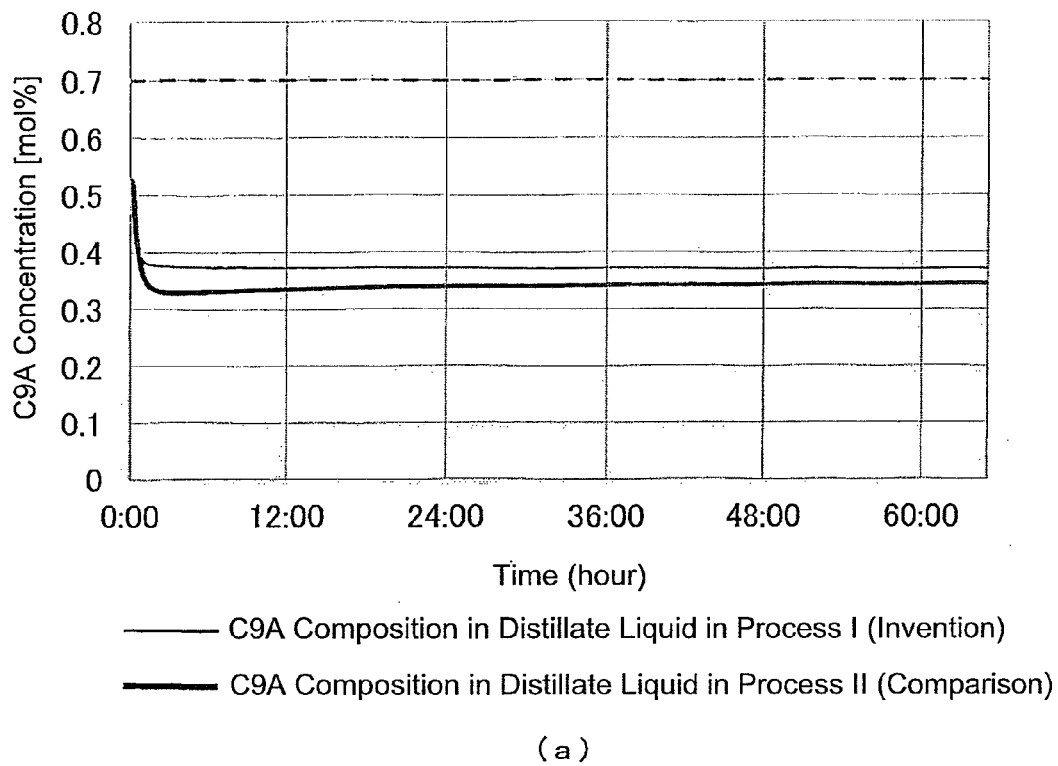
FIG. 6 shows time-dependent changes of impurity concentrations in a distillate liquid and a liquid bottom product (in case 1b)
Figure 6:
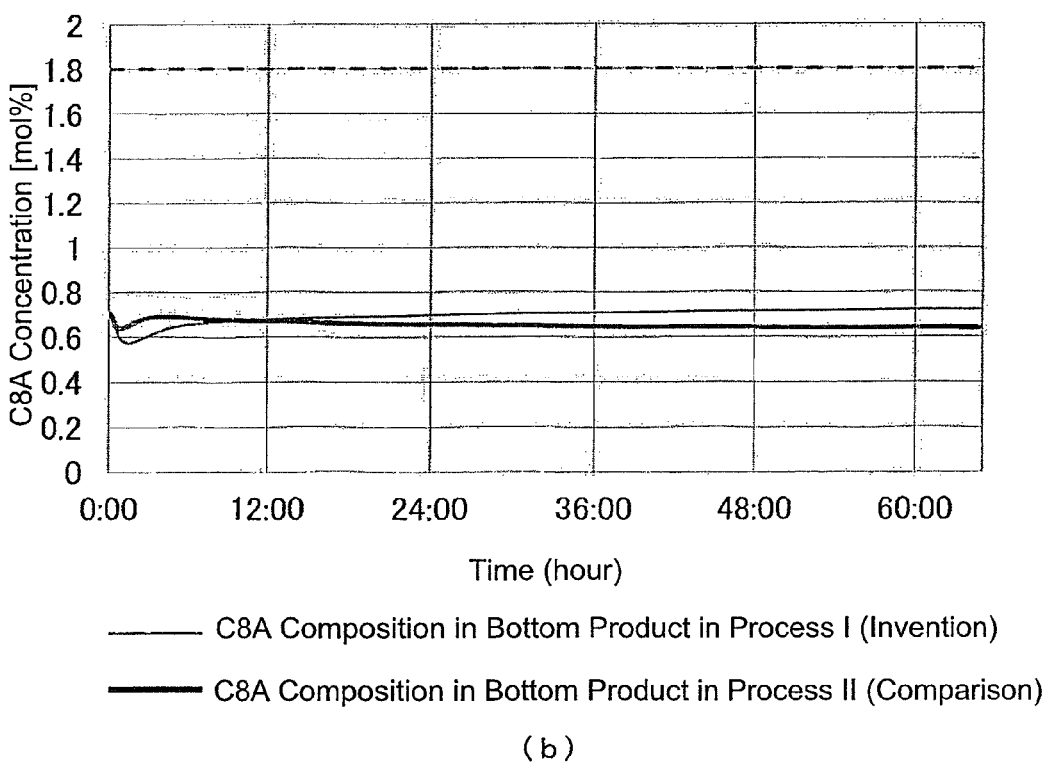

FIG. 6 shows the results of the study on case 1b (in which the composition of the feedstock was changed by −30%). FIG. 6a shows time-dependent changes of the concentration (mol %) of the C9 aromatic compound in the distillate liquid, and FIG. 6b shows time-dependent changes of the concentration (mol %) of the C8 aromatic compounds in the liquid bottom product.

Also in case 1b, there was no significant difference between process I and process II with respect to the product purity of the liquid bottom product. However, with respect to the product purity of the distillate liquid, the fluctuation in the product purity was obviously smaller in process I, and process I was found to be more robust against the disturbance.

Figure 7:
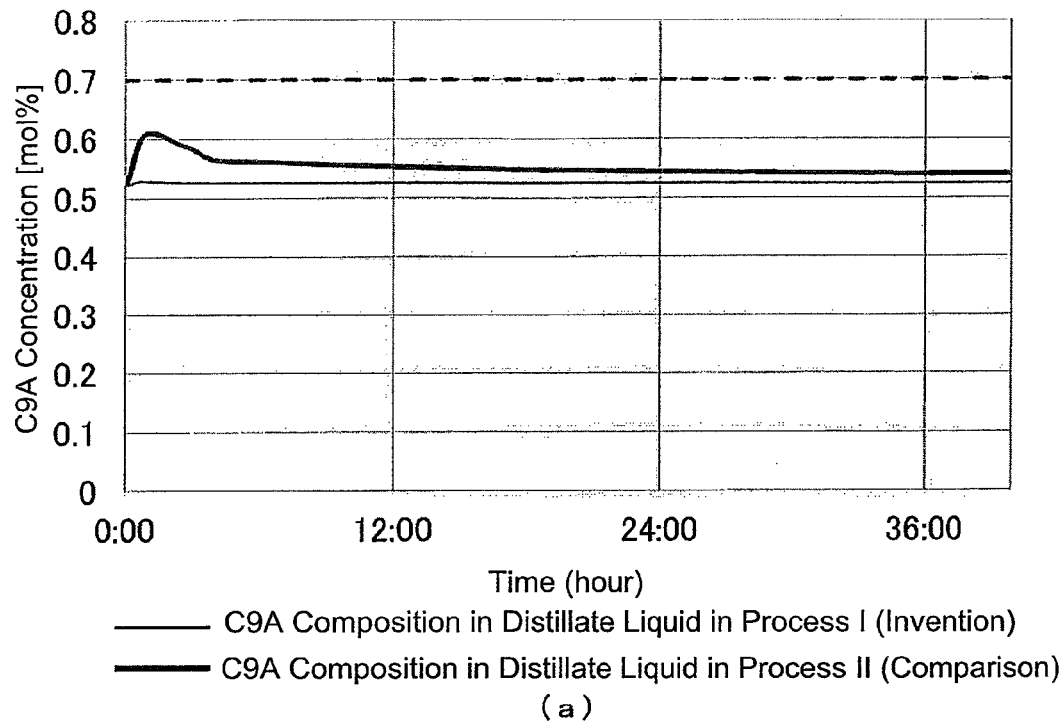
FIG. 7 shows time-dependent changes of impurity concentrations in a distillate liquid and a liquid bottom product (in case 2a)
Figure 7:
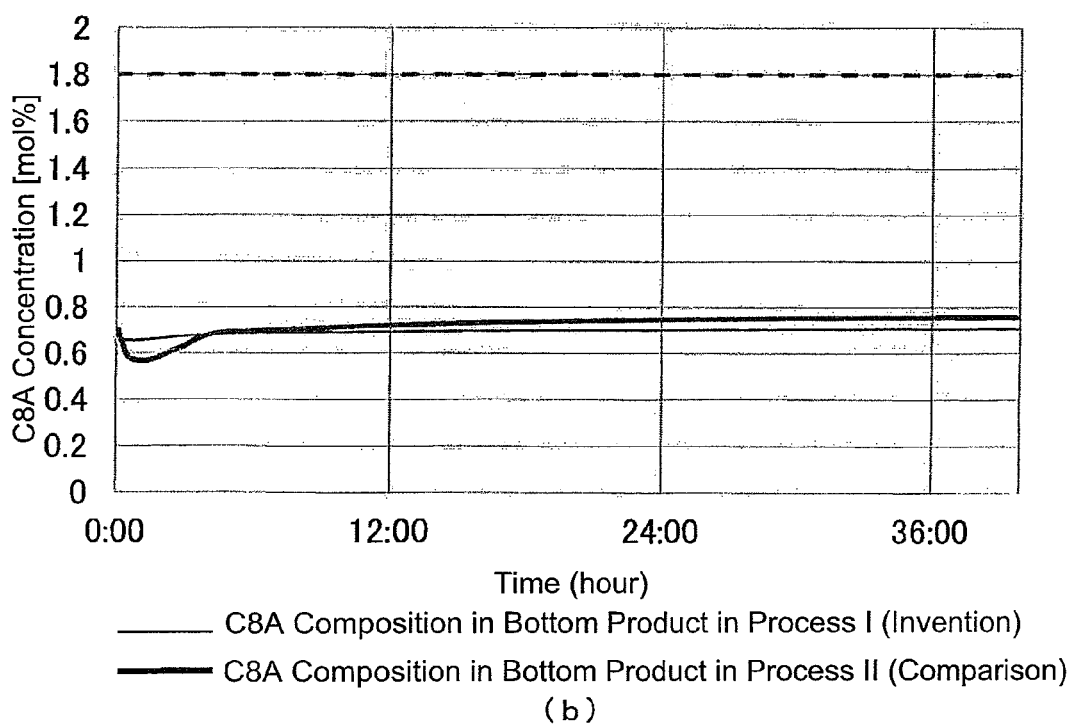

FIG. 7 shows the results of the study on case 2a (in which the set value for the flow rate of the overhead vapor of the high-pressure column to be directed to the heat exchanger E2 was changed by +10%). FIG. 7a shows time-dependent changes of the concentration (mol %) of the C9 aromatic compound in the distillate liquid, and FIG. 7b shows time-dependent changes of the concentration (mol %) of the C8 aromatic compounds in the liquid bottom product.

In case 2a, with respect to both the product purity of the distillate liquid and the product purity of the liquid bottom product, the fluctuation was smaller in process I, and process I was found to be more robust against the disturbance.

Figure 8:
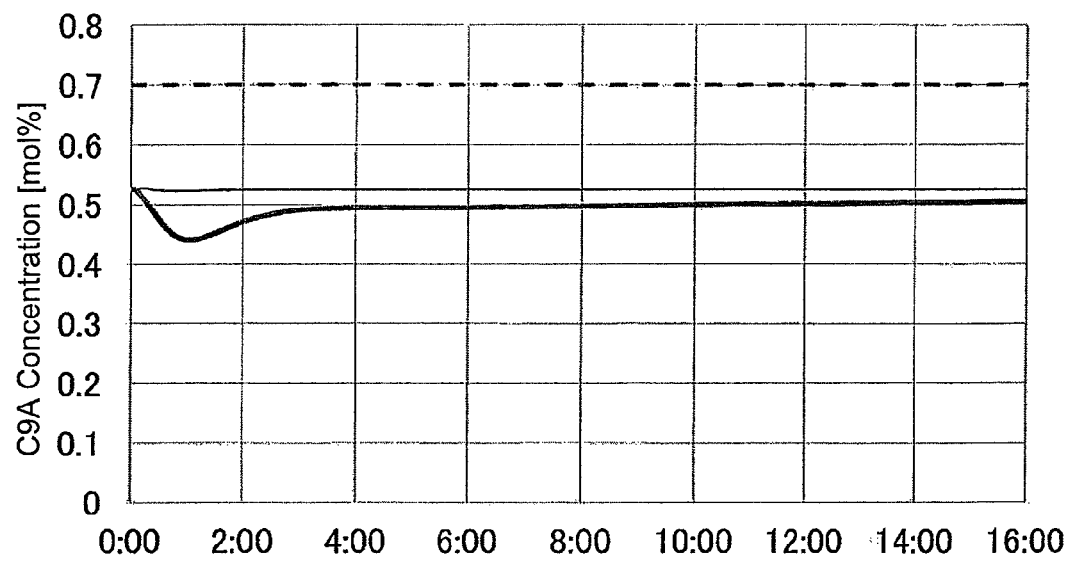
FIG. 8 shows time-dependent changes of impurity concentrations in a distillate liquid and a liquid bottom product (in case 2b)
Figure 8:
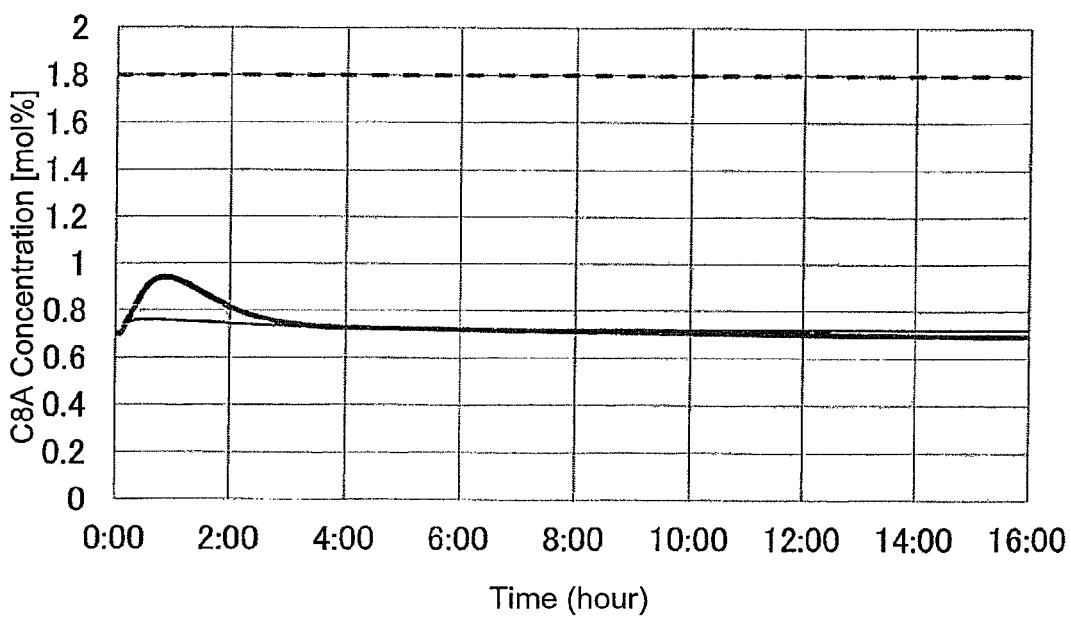

FIG. 8 shows the results of the study on case 2b (in which the set value for the flow rate of the overhead vapor of the high-pressure column to be directed to the heat exchanger E2 was changed by −10%). FIG. 8a shows time-dependent changes of the concentration (mol %) of the C9 aromatic compound in the distillate liquid, and FIG. 8b shows time-dependent changes of the concentration (mol %) of the C8 aromatic compounds in the liquid bottom product.

In case 2b, with respect to both the product purity of the distillate liquid and the product purity of the liquid bottom product, the fluctuation was smaller in process I, and process I was found to be more robust against the disturbance.

It is understood, from FIGS. 5 to 8, that there is no significant difference between process I and process II or process I is more robust with respect to the fluctuation of the product purity of the bottom product (liquid bottom product). With respect to the top product (distillate liquid), it is understood that the fluctuation of the product purity is obviously smaller in process I and process I is more robust. Accordingly, the control method of the present invention is effective against disturbances, particularly for suppressing the fluctuation of the product purity of the top product (distillate liquid).

[Examples of Preferable Configurations of HIDiC]

In a HIDiC with a shell and tube type structure, it is difficult, for example, to obtain a side-cut product and to optimize a feedstock feed stage (feed stage). From this point of view, a distillation apparatus as described in WO2011/043199 is preferably used. Accordingly, the present invention can be suitably applied to a HIDiC having any of the following configurations.

1) A HIDiC including:
a high-pressure column including a trayed section or packed bed section used as a rectifying section;
a low-pressure column located higher than the high-pressure column and including a trayed section or packed bed section used as a stripping section;
a first pipe connecting a column top of the low-pressure column with a column bottom of the high-pressure column;
a compressor installed partway along the first pipe and configured to compress vapor from the column top of the low-pressure column and to transfer the compressed vapor to the column bottom of the high-pressure column;
a heat exchanger located at a predetermined stage of the high-pressure column (particularly, the rectifying section included in the high-pressure column);
a liquid withdrawal unit located at a predetermined stage of the low-pressure column (particularly, the stripping section included in the low-pressure column) and configured to withdraw a part of liquid from the predetermined stage to the outside of the low-pressure column;
a second pipe for introducing the liquid from the liquid withdrawal unit to the heat exchanger; and
a third pipe for introducing, to a stage directly below the liquid withdrawal unit, a fluid introduced through the second pipe to the heat exchanger and then discharged from the heat exchanger.

2) A HIDiC including:
a high-pressure column including a trayed section or packed bed section used as a rectifying section;
a low-pressure column located higher than the high-pressure column and including a trayed section or packed bed section used as a stripping section;
a first pipe for connecting a column top of the low-pressure column with a column bottom of the high-pressure column;
a compressor installed partway along the first pipe and configured to compress vapor from the column top of the low-pressure column and to feed the compressed vapor to the column bottom of the high-pressure column;
a liquid sump unit located at a predetermined stage of the low-pressure column (particularly, the stripping section included in the low-pressure column) and configured to hold liquid that has flowed downward;
a heat exchanger located in the liquid sump unit of the low-pressure column;
a partition plate that is set in a predetermined position of the high-pressure column (particularly, the rectifying section included in the high-pressure column) and that is configured for complete partition of upper and lower stages;
a second pipe for introducing vapor below the partition plate to the heat exchanger; and
a third pipe for introducing, to an upper side of the partition plate, a fluid introduced through the second pipe to the heat exchanger and then discharged from the heat exchanger.

3) The HIDiC according to 2), further including a pipe, which includes a control valve, for connecting spaces, that are located up and down and that sandwich the partition plate, with each other.

4) The HIDiC according to any one of 1) to 3), further including a feedstock supply pipe for supplying a feedstock to at least one of the column top of the low-pressure column and a predetermined stage of one of the trayed section and the packed bed section.

5) The HIDiC according to 4), further including a pump and a pipe for pressure-feeding a liquid stored in the column bottom of the high-pressure column to the feedstock supply pipe.

Details of Configuration Example 1

Figure 9:
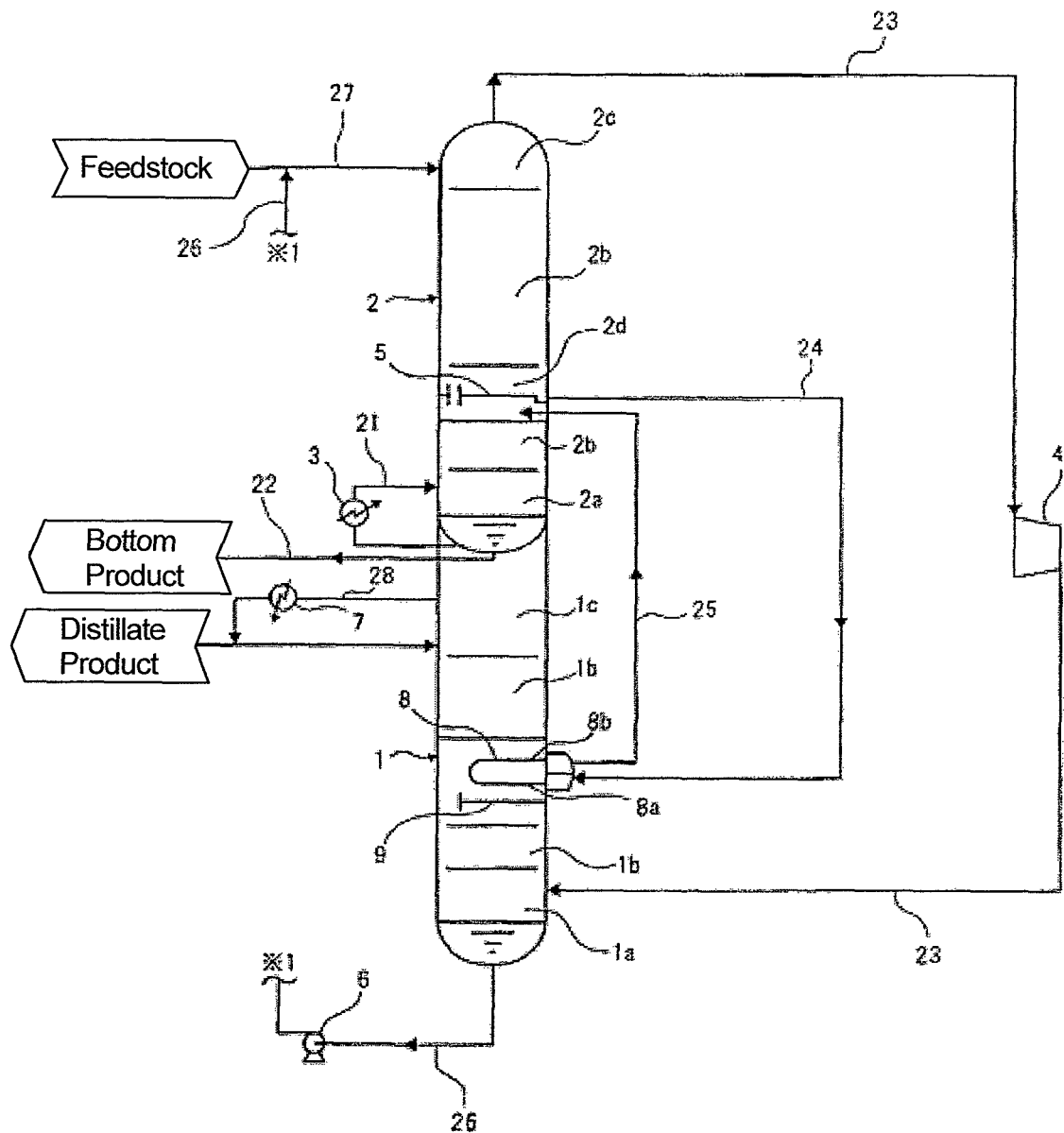
FIG. 9 shows an overall configuration of an example of a HIDiC.

FIG. 9 shows an overall configuration of a HIDiC having the configuration example 1) described above. This HIDiC includes a high-pressure column 1 and a low-pressure column 2 located higher than the high-pressure column 1. The high-pressure column 1 includes a column bottom 1a, a trayed section (or packed bed section) 1b and a column top 1c. The low-pressure column 2 also includes a column bottom 2a, a trayed section (or packed bed section) 2b and a column top 2c.

The trayed sections 1b and 2b are sections having several horizontal trays located therein. A space between adjacent trays is referred to as a stage. At each stage, gas-liquid contact is accelerated so as to cause mass transfer. As a result, a gas phase enriched in components that have higher volatility ascend to an upper stage, while a liquid phase enriched in components having lower volatility descends to a lower stage. Then, gas-liquid contact is performed again with a new liquid phase or gas phase so that mass transfer can be caused. Thus, there are more components with higher volatility at a higher stage of the column, there are more components with lower volatility at a lower stage, and a distillation operation is accomplished.

The packed bed section that can replace the trayed section is a section where a certain packing is installed in a hollow column, and gas-liquid contact is effected on its surface. By the same mechanism as that of the trayed section, there are more components with higher volatility at a higher part of the column, there are more components with lower volatility at a lower part, and a distillation operation is accomplished.

In FIG. 9, the trayed sections 1b and 2b (or packed bed sections) are shown as blank. In reality, however, the above-mentioned structures are employed.

Each of the high-pressure column 1 and the low-pressure column 2 will be described in detail. First, the low-pressure column 2 will be described.

A heater 3 referred to as a reboiler is disposed outside the column bottom 2a of the low-pressure column 2, and a pipe 21 is provided from a lower part of a space in the column bottom 2a through the heater 3 to an upper part of the space in the column bottom 2a. Accordingly a liquid descending through the trayed section 2b (or the packed bed section) of the low-pressure column 2 stays at the column bottom 2a. A part of this liquid is heated by the heater 3 to become vapor, and returns to the column bottom 2a. From the bottommost part of the column bottom 2a, a liquid bottom product that is rich in components with lower volatility is acquired through a pipe 22.

The column top 2c of the low-pressure column 2 is a position for supplying a feedstock. The column top 2c is connected via a compressor 4 to the column bottom 1a of the high-pressure column 1 by way of a pipe 23 (a line for directing an overhead vapor of a low-pressure part to a column bottom of a high-pressure part). Here, the feedstock feed position is at the column top 2c of the low-pressure column 2. However, the feedstock feed position may be at any stage of the trayed section 2b (or the packed bed section). In such a case, a part of the low-pressure column above the feedstock feed position corresponds to the rectifying section, a part of the low-pressure column below the feedstock feed position corresponds to the stripping section, and the inside of the high-pressure column corresponds to the rectifying section.

Furthermore, although there may be only one feedstock feed position, there may be a plurality of feedstocks (namely, there may be a plurality of feedstock feed positions at a plurality of different positions), and in this case, the feedstock feed positions may be, for example, at the column top 2c of the low-pressure column 2 and at another arbitrary stage (including a stage in the high-pressure column 1). With regard to the present invention, if there are a plurality of feedstock feed positions, any one amongst the plural feedstock feed positions may be selected to be regarded as a boundary, and a part above the selected feedstock feed position can be regarded as the rectifying section, and a part below the selected position can be regarded as the stripping section (here, the terms "above" and "below" are intended to mean above and below in terms of a distillation operation and do not always accord with the actual arrangement in the apparatus; even when the high-pressure column is located in a position lower than the low-pressure column, the inside of the high-pressure column is always "above" the inside of the low-pressure column).

Figure 10:
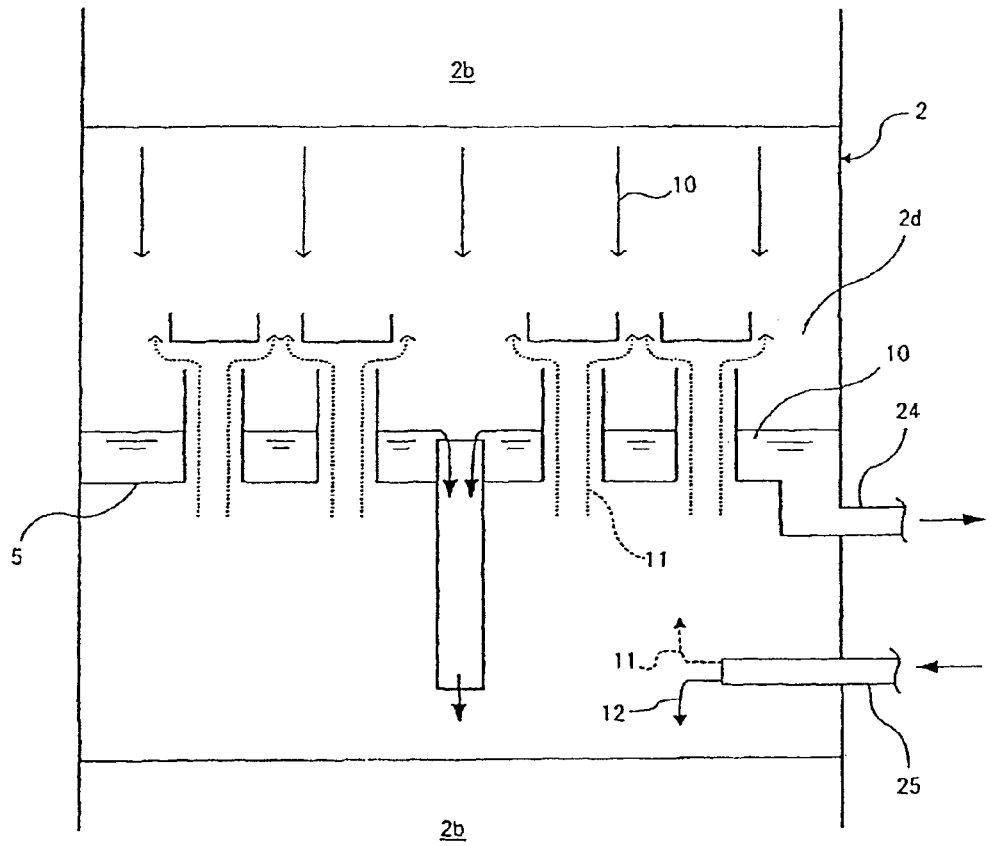
FIG. 10 shows a configuration of a liquid withdrawal unit shown in FIG. 9.

The trayed section 2b (or the packed bed section) of the low-pressure column 2 includes the liquid withdrawal unit 2d at a predetermined stage (particularly, at a stage within the stripping section). As shown in FIG. 10, the liquid withdrawal unit 2d holds a liquid 10, which has descended from an upper part of the low-pressure column 2, at a chimney tray for sump 5, and withdraws a part of the liquid 10 to the outside of the low-pressure column 2. A pipe 24 for directing a part of the liquid 10 to the high-pressure column 1 is connected to the liquid withdrawal unit 2d. A pipe 25 from the high-pressure column 1 is inserted through a shell wall of the low-pressure column 2 into a stage directly below the liquid withdrawal unit 2d. From the pipe 25 inserted into the stage directly below the liquid withdrawal unit 2d, a fluid which is a mixture of vapor 11 and liquid 12 is fed as described below, and the vapor 11 ascends while the liquid 12 descends.

Next, the high-pressure column 1 will be described.

One end of a pipe 26 is connected to a bottommost part of the column bottom 1a of the high-pressure column 1, while the other end of the pipe 26 is connected to a pipe 27 which supplies the feedstock to the column top 2c of the low-pressure column 2. In order to recycle the liquid staying at the column bottom 1a of the high-pressure column 1 to the column top 2c of the low-pressure column 2 located higher than the high-pressure column 1, a pump 6 is necessary partway along the pipe 26. The pipe 26 and a part of the pipe 27 (a downstream part from a meeting point with the pipe 26) together form a line for directing a column bottom liquid of a high-pressure part to a low-pressure part, particularly to the column top of the low-pressure part.

A condenser 7 is provided outside the column top 1c of the high-pressure column 1, and a pipe 28 is connected from an upper part of a space in the column top 1c to the condenser 7. Thus, vapor that has moved to the column top 1c of the high-pressure column 1 is cooled by the condenser 7 to become a liquid, and a distillate liquid that is rich in components with higher volatility is acquired. A part of this liquid is refluxed to the column top 1c as necessary.

In addition, a tube-bundle-type heat exchanger 8 is inserted into a predetermined stage (particularly, a stage within the rectifying section) of the trayed section 1b (or the packed bed section) of the high-pressure column 1. The parallel tube portions in the U-shaped tube of the tube-bundle-type heat exchanger 8 are placed along a chimney tray for sump 9 for temporarily holding a condensed liquid and for re-distributing vapor ascending from below. A lower tube portion 8a of the parallel tube portions is connected to the pipe 24 which is connected to the liquid withdrawal unit 2d of the low-pressure column 2. An upper tube portion 8b is connected to the pipe 25 that is inserted into the stage directly below the liquid withdrawal unit 2d.

An operation of the tube-bundle-type heat exchanger 8 will now be described.

Figure 11:
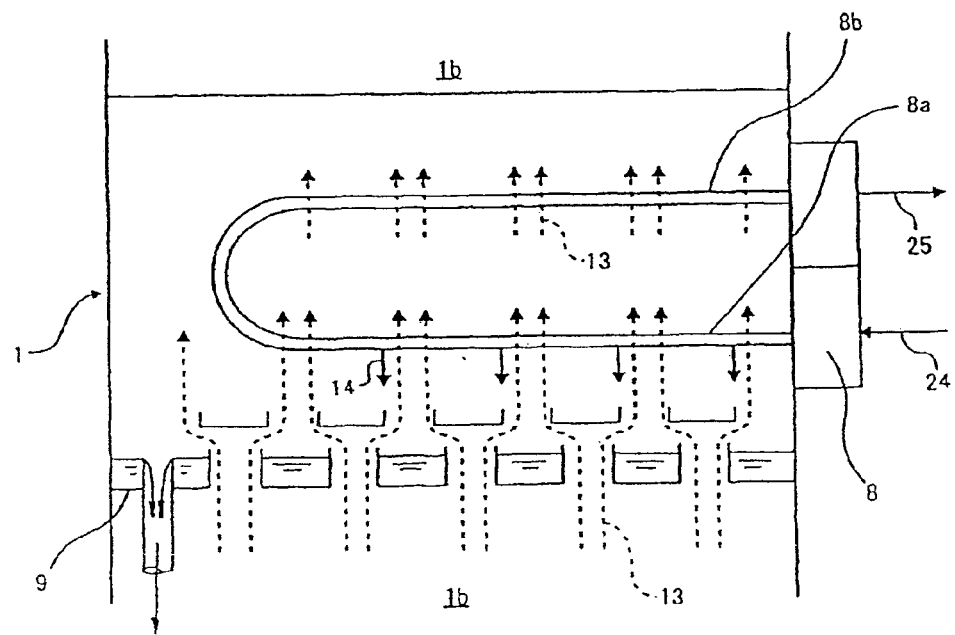
FIG. 11 shows a peripheral configuration of a tube-bundle-type heat exchanger located in a high-pressure column shown in FIG. 9.

In the apparatus, the pressure and the temperature of vapor flowing out of the column top 2c of the low-pressure column 2 are increased by the compressor 4, and the resulting vapor is supplied to the column bottom 1a of the high-pressure column 1. The vapor 13 (refer to FIG. 11) thus increased in the temperature is introduced into and ascends through the trayed section 1b and comes into contact with the U-shaped tube of the tube-bundle-type heat exchanger 8. In this case, a liquid at an arbitrary stage (particularly, a stage within the stripping section) of the low-pressure column 2 is introduced through the pipe 24 to the lower tube portion 8a of the heat exchanger 8. Thus, the liquid in the tube portion 8a is heated by the heat of the vapor 13, and a part of the vapor 13 in contact with the tube portion 8a becomes a liquid 14, and this liquid descends. The upper tube portion 8b of the heat exchanger 8 is also heated by the heat of the vapor 13. Thus, the liquid introduced through the pipe 24 into the heat exchanger 8 changes into a fluid which is a mixture of a liquid phase and a gas phase while the liquid moves through the lower tube portion 8a and then through the upper tube portion 8b. This fluid then passes through the pipe 25 located outside the column to be introduced to the stage directly below the liquid withdrawal unit 2d of the low-pressure column 2 (refer to FIG. 9). Any pressure-feeding means such as a pump is not needed to circulate such fluids because the configuration described herein employs the thermo-siphon system.

In other words, because the liquid withdrawal unit 2d of the low-pressure column 2 is connected to the lower tube portion 8a of the heat exchanger 8 of the high-pressure column 1 via the pipe 24 and because the upper tube portion 8b of the heat exchanger 8 of the high-pressure column 1 is connected to the stage directly below the liquid withdrawal unit 2d of the low-pressure column 2 via the pipe 25, the liquid descends from the low-pressure column 2 to the high-pressure column 1 by gravity, which causes the above-mentioned fluid to flow from the high-pressure column 1 to the low-pressure column 2 even if no pump is provided.

As described above, in this example, heat can be removed from the vapor in the high-pressure column 1 by the heat exchanger 8, and the heat can be transferred from the high-pressure column 1 (particularly, the rectifying section) to the low-pressure column 2 (particularly, the stripping section) through the pipe 25. A heat transfer system using the pipes 24 and 25 and the heat exchanger 8 as in this example is configured as if a side condenser was installed at an arbitrary stage (particularly, a stage within the rectifying section) of the high-pressure column 1, and, simultaneously, as if a side reboiler was installed at an arbitrary stage (particularly, a stage within the stripping section) of the low-pressure column 2. Thus, as compared with a distillation apparatus that does not include such a heat transfer system, the amount of heat removed at the condenser 7 of the high-pressure column 1 can be reduced, and the amount of heat supplied at the reboiler 3 of the low-pressure column 2 can be reduced. As a result, a distillation apparatus having extremely high energy efficiency can be provided.

FIG. 9 shows only one heat transfer system. However, a plurality of heat transfer systems equivalent to, for example, 10 to 30% of the total number of theoretical stages can be installed. Needless to say, the number of heat transfer system(s) to be installed and the locations of the heat exchanger(s) and the pipes can be arbitrarily determined according to the design specification.

In such a HIDiC, the flow control valve 101 can be provided in the intermediate reflux line (particularly, the pipe 26) as shown in FIG. 1 so as to control the flow rate of the intermediate reflux. The flow rate of the intermediate reflux may be controlled by another flow rate control means such as control of the number of revolutions of a pump.

Details of Configuration Example 2

Next, a HIDiC having the above-mentioned configuration example 2) will be described. Components similar to those of the configuration example 1) will be described by using similar reference numerals.

Figure 12:
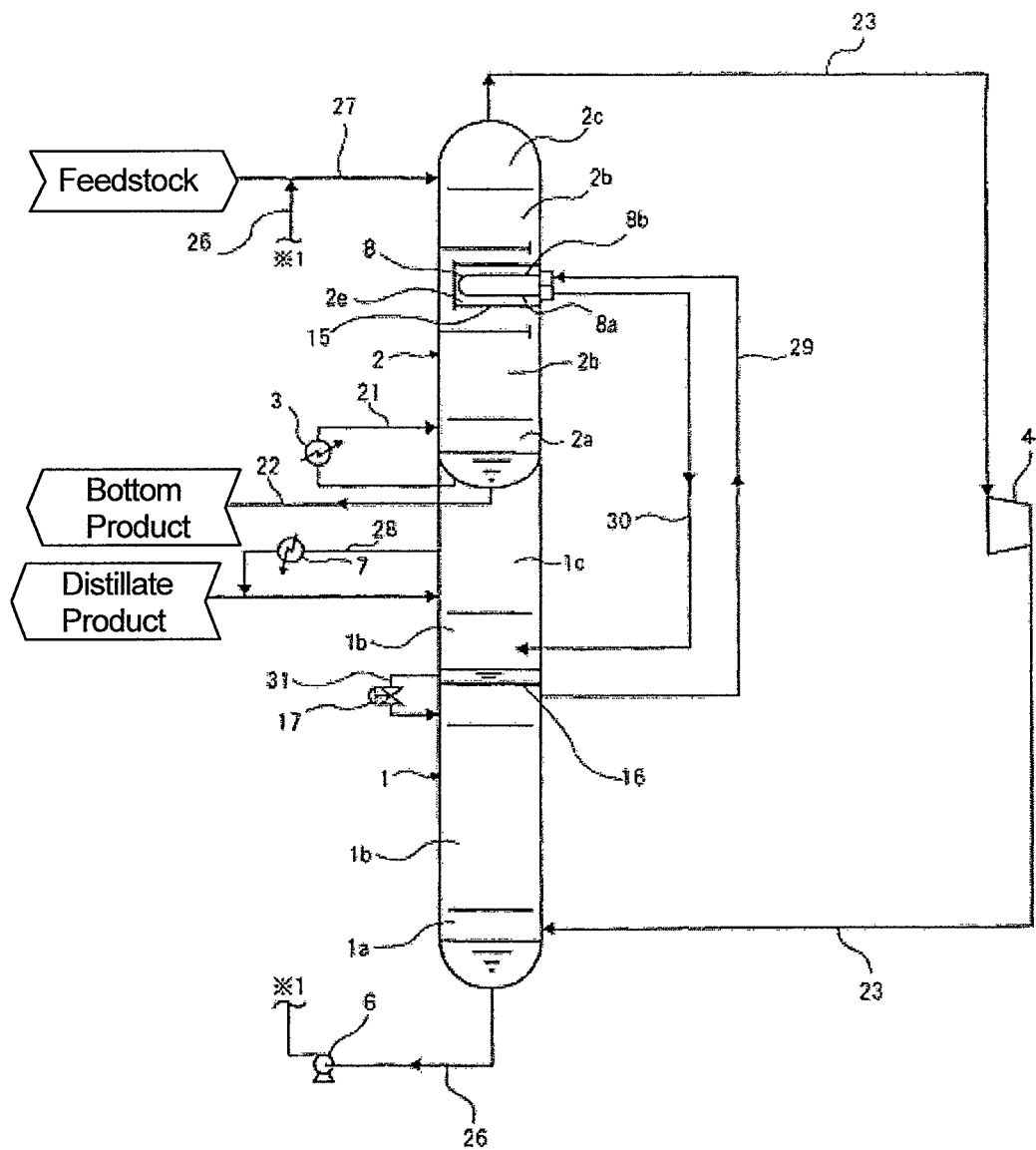
FIG. 12 shows an overall configuration of another example of a HIDiC.

FIG. 12 shows an overall configuration of a HIDiC having the configuration example 2). This distillation apparatus includes a high-pressure column 1 and a low-pressure column 2 located in a position higher than the high-pressure column 1. The high-pressure column 1 includes a column bottom 1a, a trayed section (or a packed bed section) 1b and a column top 1c. The low-pressure column 2 similarly includes a column bottom 2a, a trayed section (or a packed bed section) 2b and a column top 2c. The trayed section or the packed bed section has the same structure as described for the configuration example 1).

This example is different from the configuration example 1) in that a tube-bundle-type heat exchanger 8 is provided in the low-pressure column 2 (particularly, in the stripping section).

In the low-pressure column 2 of this example, components accompanying the column bottom 2a and the column top 2c (such as the reboiler 3, and the pipes 21, 22, 23 and 27) are the same as those used in the configuration example 1) as shown in FIG. 12, but components relating to the trayed section 2b (or the packed bed section) are different from those used in the configuration example 1).

Figure 13:
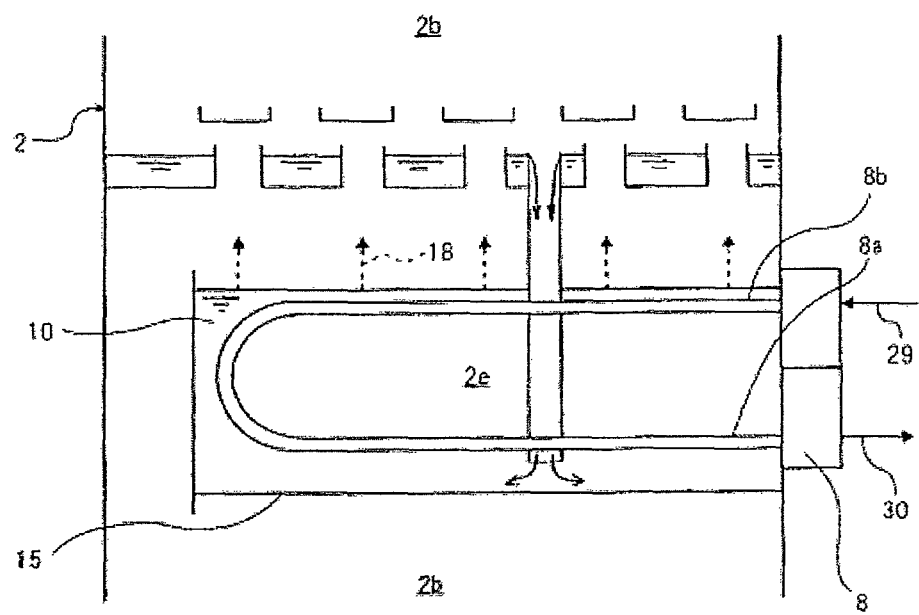
FIG. 13 shows a peripheral configuration of a tube-bundle-type heat exchanger located in a low-pressure column shown in FIG. 12.

The trayed section 2b (or the packed bed section) includes a liquid sump unit 2e at a predetermined stage (particularly, at a stage within the stripping section). The liquid sump unit 2e can store a predetermined amount of liquid 10 that has flowed down onto a chimney tray for sump 15, and can drop liquid spilled from the chimney tray for sump 15. A tube-bundle type heat exchanger 8 is inserted into the liquid sump unit 2e (refer to FIG. 13), so that a U-shaped tube of the tube-bundle-type heat exchanger 8 can be dipped in the liquid stored in the liquid sump unit 2e. Parallel tube portions 8a and 8b in the U-shaped tube of the tube-bundle-type heat exchanger 8 are placed along the chimney tray for sump 15.

A pipe 29 (refer to FIG. 12) for feeding a fluid from the high-pressure column 1 to the low-pressure column 2 is connected to the upper tube portion 8b of the parallel tube portions. A pipe 30 (refer to FIG. 12) for feeding a fluid from the low-pressure column 2 to the high-pressure column 1 is connected to the lower tube portion 8a.

An operation of the heat exchanger 8 in the liquid sump unit 2e will now described.

In this distillation apparatus, a feedstock liquid descends from the column top 2c of the low-pressure column 2 through a tray or a packed layer. This liquid 10 (refer to FIG. 13) stays at the liquid sump unit 2e on the chimney tray for sump 15 that is located at an arbitrary stage (particularly, at a stage within the stripping section). The U-shaped tube of the tube-bundle-type heat exchanger 8 is placed in the liquid sump unit 2e, and hence the U-shaped tube is dipped in the liquid 10. In this state, when high-temperature vapor present within the high-pressure column 1 is introduced through the pipe 29 into the upper tube portion 8b of the heat exchanger 8, a part of the liquid 10 in contact with the outer wall of the tube portions 8b and 8a, through which the high-temperature vapor moves, is heated to become vapor 18 and ascends (refer to FIG. 13). Furthermore, the high-temperature vapor having been introduced from the pipe 29 into the heat exchanger 8 changes into a fluid which is a mixture of a liquid phase and a gas phase, while the vapor moves through the upper tube portion 8b and then through the lower tube portion 8a. This fluid then passes through the pipe 30 located outside the column to be introduced to a stage above a partition plate 16 of the high-pressure column 1 described later (refer to FIG. 12). A part above the partition plate 16 is set to have a lower operation pressure than a part below the partition plate 16, and the fluid is circulated by this pressure difference. For such fluid circulation, any pressure-feeding means such as a pump is not needed in this configuration as is the same as in the configuration example 1).

In other words, because the predetermined stage (particularly, the stage within the rectifying section) of the high-pressure column 1 is connected to the upper tube portion 8b of the heat exchanger 8 in the low-pressure column 2 via the pipe 29 and because the lower tube portion 8a of the heat exchanger 8 in the low-pressure column 2 is connected to the predetermined stage of the high-pressure column 1 via the pipe 30, high-pressure vapor present in the high-pressure column 1 ascends toward the heat exchanger 8 of the low-pressure column 2 through the pipe 29 owing to the pressure difference between the parts below and above the partition plate 16. As a result, the liquid condensed from the vapor within the heat exchanger 8 is then pushed out of the low-pressure column 2 to the pipe 30 located outside the low-pressure column, and then descends to the high-pressure column 1 by gravity. Thus, any pressure-feeding means such as a pump is not necessary.

Furthermore, the high-pressure column 1 of this example will be described.

Also with respect to the high-pressure column 1, components accompanying the column bottom 1a and the column top 1c (such as the condenser 7 and the pipes 23, 26 and 28) are the same as those used in the configuration example 1) as shown in FIG. 12, but components relating to the trayed section 1b (or the packed bed section) are different from those of the configuration example 1). Specifically, the trayed section 1b (or the packed bed section) of the high-pressure column 1 is completely partitioned into upper and lower stages by a partition plate 16 at a position (particularly, a position within the rectifying section) located partway along the trayed section 1b. The stage directly below the partition plate 16 communicates with a pipe 29. Ascending vapor in this stage is transferred, through the pipe 29 extending in the vertical direction, to the upper tube portion 8b of the heat exchanger 8 placed in the liquid sump unit 2e of the low-pressure column 2.

Into the upper stage of the partition plate 16, a pipe 30 from the low-pressure column 2 is inserted through the shell wall of the high-pressure column 1. A fluid which is a mixture of vapor and liquid is introduced into the upper stage of the partition plate 16 through this pipe 30, and the vapor ascends while the liquid descends to stay on the partition plate 16. The ascending vapor reaches the column top 1c, and then the vapor passes through the pipe 28 to be cooled by the condenser 7. As a result, a distillate liquid rich in components with high volatility is acquired.

Furthermore, the two stages vertically adjacent to each other with the partition plate 16 sandwiched therebetween can communicate with each other through a pipe 31 having a control valve 17. The liquid held on the partition plate 16 is fed to the stage below the partition plate 16 by an operation of opening the control valve 17 when appropriate.

As described above, in this example, heat can be removed from the high-pressure column 1 (particularly, from the rectifying section) to be transferred into the low-pressure column 2 (particularly, into the stripping section) by withdrawing vapor from the high-pressure column 1 (particularly, from the rectifying section) through the pipe 29 to the outside the column and introducing the vapor into the heat exchanger 8 in the low-pressure column 2 (particularly, in the stripping section). A heat transfer system using the pipes 29 and 30 and the heat exchanger 8, as in the case of this example, is configured as if a side condenser was installed at an arbitrary stage (particularly, a stage within the rectifying section) of the high-pressure column 1, and, simultaneously, as if a side reboiler was installed at an arbitrary stage (particularly, a stage within the stripping section) of the low-pressure column 2.

Thus, as compared with a distillation apparatus that does not include such a heat transfer system, the amount of heat removed at the condenser 7 of the high-pressure column 1 can be reduced, and the amount of heat supplied at the reboiler 3 of the low-pressure column 2 can be reduced. As a result, a distillation apparatus having extremely high energy efficiency can be provided.

FIG. 12 shows only one heat transfer system. However, also in this example, the number of heat transfer system(s) to be installed and the locations of the heat exchanger(s) and the pipes can be arbitrarily determined according to the design specification as in configuration example 1).

Also in such a HIDiC, the flow control valve 101 can be provided in the intermediate reflux line (particularly, the pipe 26) as shown in FIG. 1 so as to control the flow rate of the intermediate reflux. The flow rate of the intermediate reflux may be controlled by another flow rate control means such as control of the number of revolutions of a pump.

EXPLANATION OF LETTERS OR NUMERALS

1: high-pressure column (high-pressure part)
1a: column bottom
1b: trayed section (or packed bed section)
1c: column top
2: low-pressure column (low-pressure part)
2a: column bottom
2b: trayed section (or packed bed section)
2c: column top
2d: liquid withdrawal unit
2e: liquid sump unit
3: heater (reboiler)
4: compressor
5: tray
6: pressure-feeding means
7: condenser
8: tube-bundle-type heat exchanger
5, 15: chimney tray for sump
9: chimney tray for sump
10, 12, 14: liquid
11, 13, 18: vapor
16: partition plate
17: control valve
21, 22, 23, 24, 25, 26, 27, 28, 29, 30, 31: pipe or line
40: intermediate reflux line
101: flow control valve
102: liquid level control valve
E1 to E4: heat exchanger for transferring heat from rectifying section to stripping section

What is claimed is:

1. A method for controlling a distillation apparatus which comprises
   a high-pressure part comprising the whole or a part of a rectifying section and configured to perform gas-liquid contact at a relatively high pressure;
   a low-pressure part comprising the whole or a part of a stripping section and configured to perform gas-liquid contact at a relatively low pressure;
   a line for directing an overhead vapor of the low-pressure part to a column bottom of the high-pressure part;
   a line for directing a column bottom liquid of the high-pressure part to a column top of the low-pressure part; and
   a heat exchange structure configured to transfer heat from the rectifying section to the stripping section,
   wherein the method comprises controlling a flow rate of the column bottom liquid directed from the high-pressure part to the low-pressure part at a predetermined target value which is adjusted so that an impurity concentration in a bottom product or a distillate product is to be a predetermined value or less.

* * * * *